(12) United States Patent
Wen

(10) Patent No.: US 11,330,074 B2
(45) Date of Patent: May 10, 2022

(54) TCP (TRANSMISSION CONTROL PROTOCOL) FAST OPEN FOR CLASSIFICATION ACCELERATION OF CACHE MISSES IN A NETWORK PROCESSOR

(71) Applicant: Fortinet, Inc., Sunnyvale, CA (US)

(72) Inventor: Shushan Wen, Pleasant Hill, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/992,059

(22) Filed: Aug. 12, 2020

(65) Prior Publication Data

US 2022/0053065 A1 Feb. 17, 2022

(51) Int. Cl.
| | | |
|---|---|---|
| *H04L 67/568* | (2022.01) | |
| *G06F 12/0888* | (2016.01) | |
| *H04L 69/16* | (2022.01) | |
| *H04L 9/40* | (2022.01) | |
| *H04L 29/06* | (2006.01) | |

(52) U.S. Cl.
CPC ...... *H04L 67/2842* (2013.01); *G06F 12/0888* (2013.01); *H04L 69/16* (2013.01); *G06F 2212/154* (2013.01); *H04L 63/0227* (2013.01)

(58) Field of Classification Search
CPC .............. H04L 67/2842; H04L 69/16; H04L 63/0227; G06F 12/0888; G06F 2212/154
USPC ....................................................... 709/217
See application file for complete search history.

(56) References Cited

U.S. PATENT DOCUMENTS

| | | | | |
|---|---|---|---|---|
| 7,177,311 | B1* | 2/2007 | Hussain | H04L 45/00 370/395.32 |
| 7,376,125 | B1* | 5/2008 | Hussain | H04L 45/00 370/352 |
| 9,432,284 | B2* | 8/2016 | Goyal | H04L 45/48 |
| 10,003,530 | B2* | 6/2018 | Zhang | H04L 67/288 |
| 10,819,682 | B1* | 10/2020 | Deepak | H04L 63/0236 |
| 2004/0010545 | A1* | 1/2004 | Pandya | H04L 69/165 709/203 |
| 2006/0136570 | A1* | 6/2006 | Pandya | H04L 63/20 709/217 |
| 2010/0103946 | A1* | 4/2010 | Nomura | H04L 43/0852 370/412 |
| 2011/0125748 | A1* | 5/2011 | Wood | H04L 43/028 707/E17.046 |

(Continued)

OTHER PUBLICATIONS

RFC 74 Y. Cheng et al. pp. 1-26, Dec. 2014.*

(Continued)

*Primary Examiner* — Tauqir Hussain
(74) *Attorney, Agent, or Firm* — Law Office of Dorian Cartwright; Dorian Cartwright

(57) ABSTRACT

A packet parser generates a key from TCP metadata of a data packet for a specific session. A packet cache stores recent network policy identifiers associated with a plurality of network sessions, wherein the key is used as an index to search the packet cache. The packet cache responsive to a cache miss, checks a TFO cookie field for a rule ID stored by the client during a previous session as generated by the network processor. If there is no rule ID, a classification pipeline is activated. On the other hand, responsive to a cache hit, or responsive to identifying a rule ID for the session from the TFO cookie, the classification pipeline is bypassed for the data packets of the specific session.

20 Claims, 6 Drawing Sheets

(56) References Cited

U.S. PATENT DOCUMENTS

| | | | | |
|---|---|---|---|---|
| 2012/0311121 A1* | 12/2012 | Shafrir | .................... | H04L 69/22 |
| | | | | 709/223 |
| 2013/0227166 A1* | 8/2013 | Ravindran | ............ | H04L 67/327 |
| | | | | 709/238 |
| 2014/0334321 A1* | 11/2014 | Sanivsky | ............ | H04L 47/2441 |
| | | | | 370/252 |
| 2015/0128267 A1* | 5/2015 | Gupta | .................. | H04L 63/1408 |
| | | | | 726/23 |
| 2016/0173371 A1* | 6/2016 | Bays | .................... | H04L 49/602 |
| | | | | 370/389 |
| 2016/0285992 A1* | 9/2016 | Katsev | ................ | H04L 67/2852 |
| 2018/0176281 A1* | 6/2018 | Arunachalam | ......... | H04L 69/22 |
| 2021/0067453 A1* | 3/2021 | Cui | .......................... | H04L 1/18 |
| 2021/0204152 A1* | 7/2021 | Vasudevan | .......... | H04L 47/2441 |

OTHER PUBLICATIONS

TCP Traffic Classification using Markov Models Conference pager, Apr. 2010 pp. 1-15.*

CuckooFlow: Acheiving Fast Packet Classification for virtual OpenFlow Switching. 2019 IEEE Intl Conf on parallel & distributed processing. Bing Xiong et al. pp. 1123-1130, published: 2019.*

* cited by examiner

TCP (TRANSMISSION CONTROL PROTOCOL) FAST OPEN FOR CLASSIFICATION ACCELERATION OF CACHE MISSES IN A NETWORK PROCESSOR

FIELD OF THE INVENTION

The invention relates generally to computer networking, and more specifically, TCP fast open for classification acceleration for cache misses in a network processor.

BACKGROUND

In network processors for a network device handling packets, classification is an expensive process regarding time complexity. Thus a cache mechanism is generally enabled to accelerate the classification, where the information of the policy that has been found for recent flows can be kept in a cache. Similar to any other caches, space limitation is always a concern for network processor designers, who want to find a good trade-off between the cache capacity and NP performance. A cache replacement scheme is hence required when a new policy is to be stored when the cache is full.

In an ideal scenario, packets in a flow enter the NP with intervals short enough so that the corresponding policy is still in the cache. In the real world, however, this is often not the case. A great number of TCP connections follow an on/off pattern, which leads to cache misses and the NP has to re-do the classification.

TFO is a TCP option described in RFC 7413. Its design intention is to save up to one round trip time (RTT) of TCP caused by conventional three-way handshake (3WHS) after a short timeout.

What is needed is a robust technique for accelerating TCP classification sessions for cache misses in a network processor.

SUMMARY

To meet the above-described needs, methods, computer program products, and systems for accelerating TCP classification sessions for cache misses in a network processor.

In one embodiment, a packet parser generates a key from TCP metadata of a data packet for a specific session. A packet cache stores recent network policy identifiers associated with a plurality of network sessions, wherein the key is used as an index to search the packet cache.

In another embodiment, the packet cache responsive to a cache miss, checks a TFO cookie field for a rule ID stored by the client during a previous session as generated by the network processor. If there is no rule ID, a classification pipeline is activated. On the other hand, responsive to a cache hit, or responsive to identifying a rule ID for the session from the TFO cookie, the classification pipeline is bypassed for the data packets of the specific session.

Advantageously, throughput is increased in network processors. Furthermore, the network architecture provides better performance for end devices.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for accelerating TCP classification sessions for cache misses in a network processor.

Figure 1:
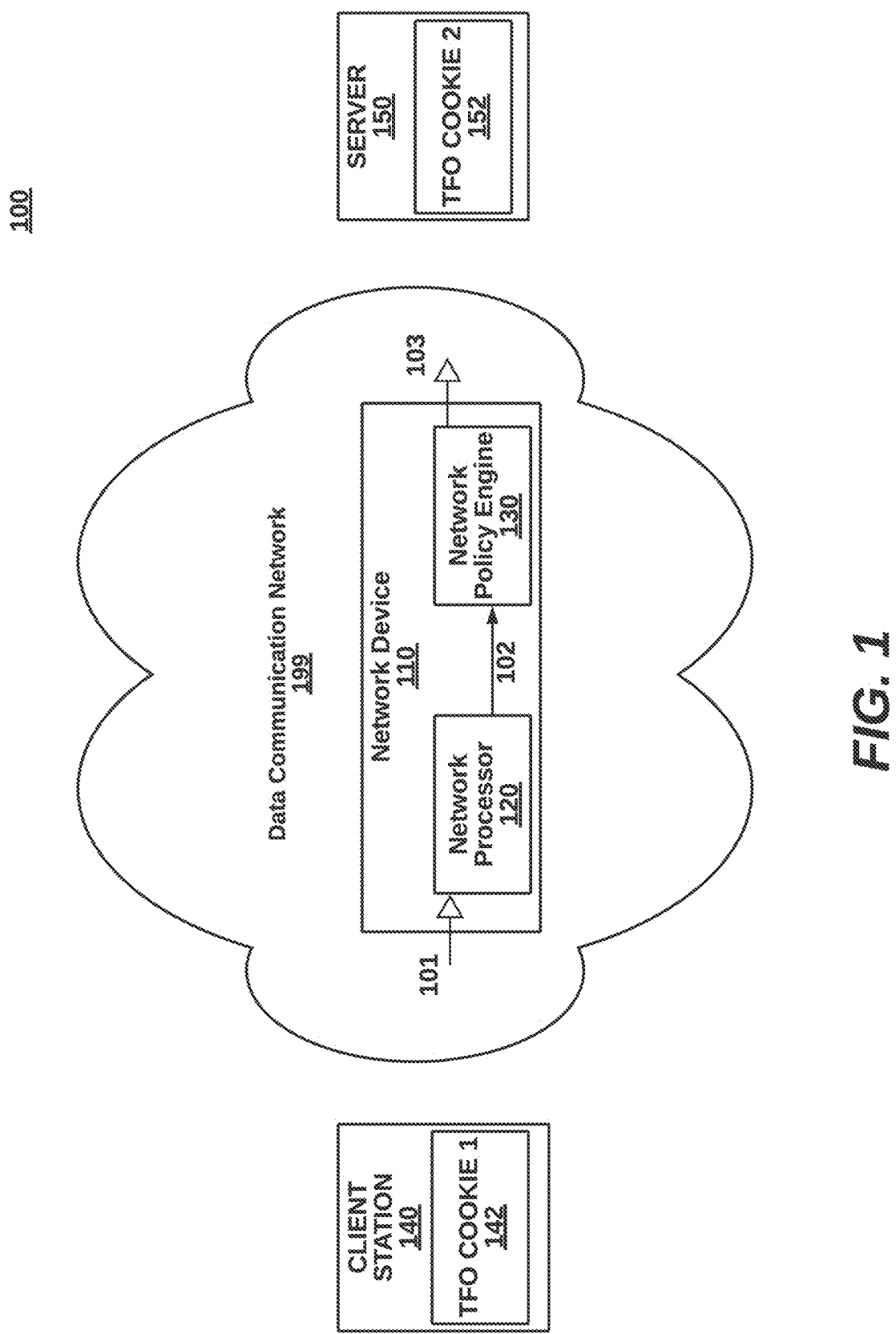
FIG. 1 is a high-level block diagram illustrating a system for accelerating TCP classification of sessions for cache misses in a network processor, according to one embodiment.
Figure 2:
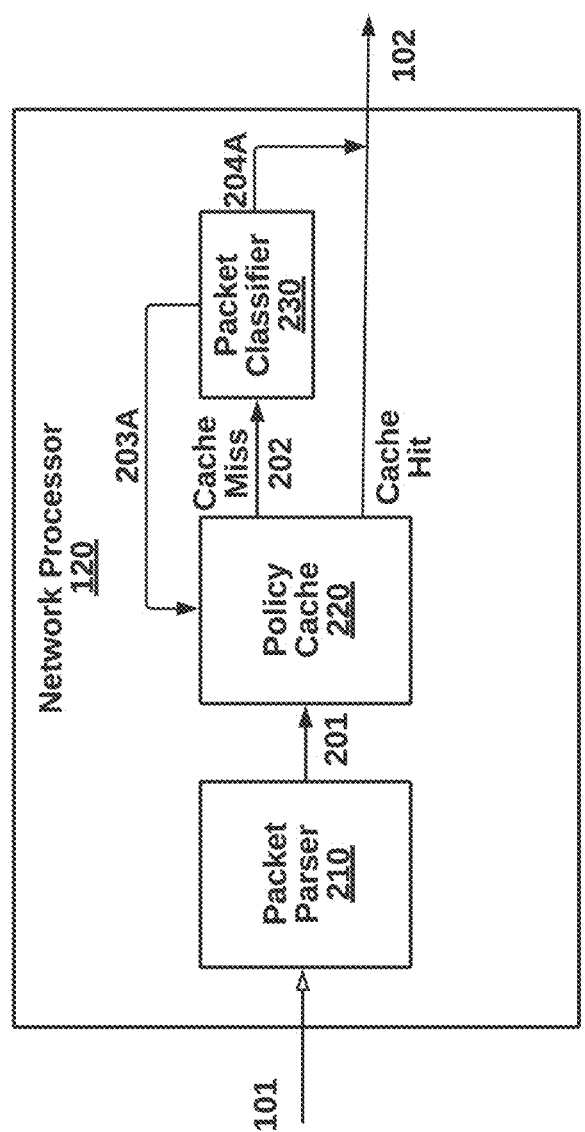
FIG. 2 is a more detailed block diagram illustrating an example network processor of the system of FIG. 1, according to one embodiment.
Figure 3:
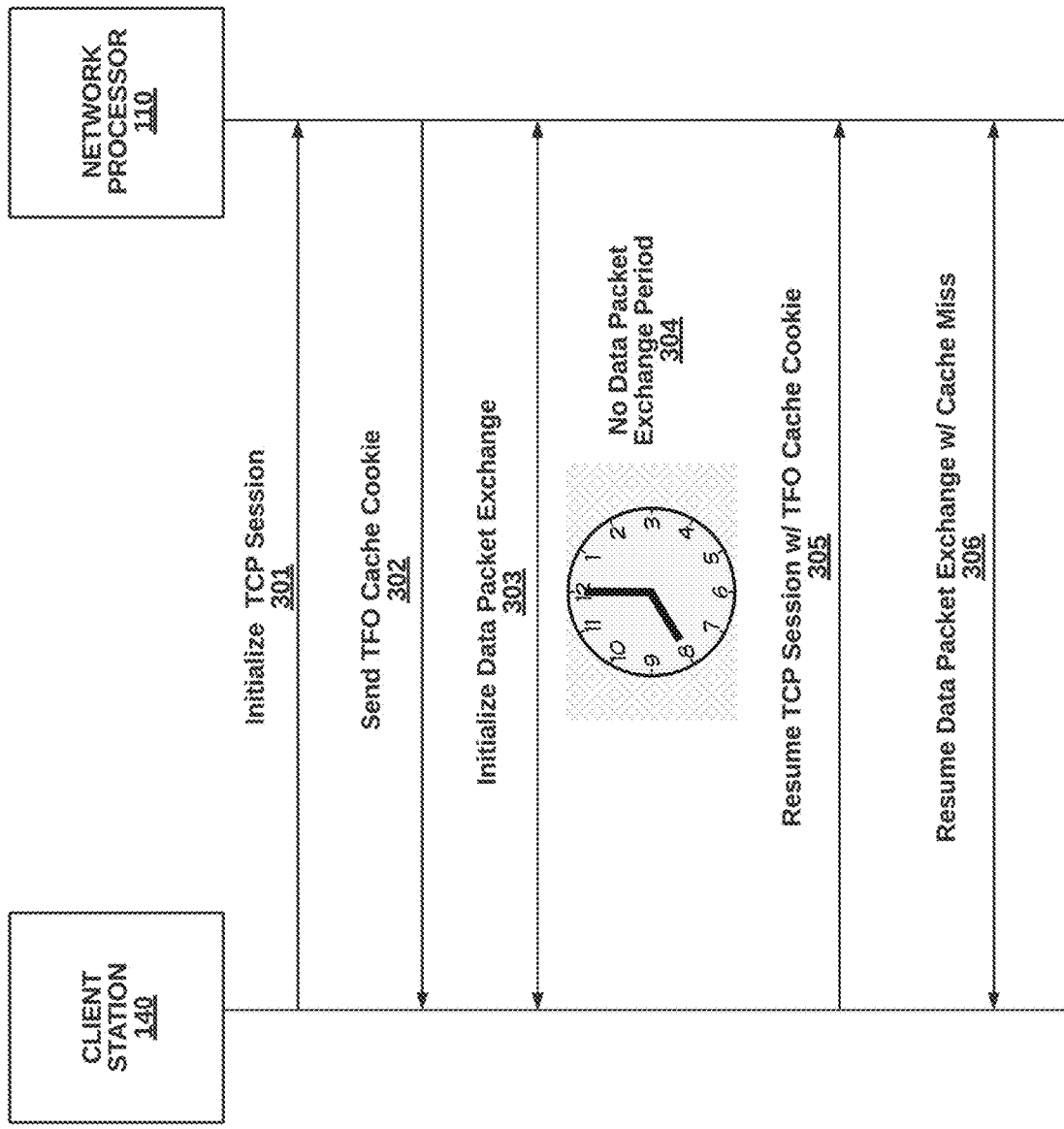
FIG. 3 is a high-level interaction diagram illustrating communications for 1-sided TFO cookie management, according to one embodiment.

Systems for TCP Classification Acceleration (FIGS. 1-3)

FIG. 1 is a high-level block diagram illustrating a system 100 for accelerating TCP classification sessions for cache misses in a network processor, according to one embodiment. The system 100 includes a network device 110 with a network processor 120 and a network policy database 130, within network infrastructure for a data communication system 101. Many other embodiments of the system 100 besides the present use case are possible. Component can be electrically coupled or otherwise coupled in data communication. Moreover, the network device 110 typically includes additional functionality depending on its role within the network architecture. For example, a firewall performs deep packet inspection for identifying malicious packets. In another example, an access point manages Wi-Fi stations and communicates with other access points and can be managed by Wi-Fi controllers.

The network device 110 receives input data packets 101 for processing from the data communication system 101 at a network interface and transmits output data packets 103 after processing. The network device 110 can be an access point, a gateway, a router, a switch, a firewall, a Wi-Fi controller, or any other device that processes network traffic. For example, an access point can receive a session of data packets from a wireless station on a Wi-Fi portion of the data communication system 101 and process for transmission on to a remote server on a WAN portion of the data communication system 101, based on packet processing. In another example, a firewall can receive a session of data packets headed inbound to a Wi-Fi portion of the data communication network 101 and process for application of Wi-Fi or enterprise network policies.

Figure 4:
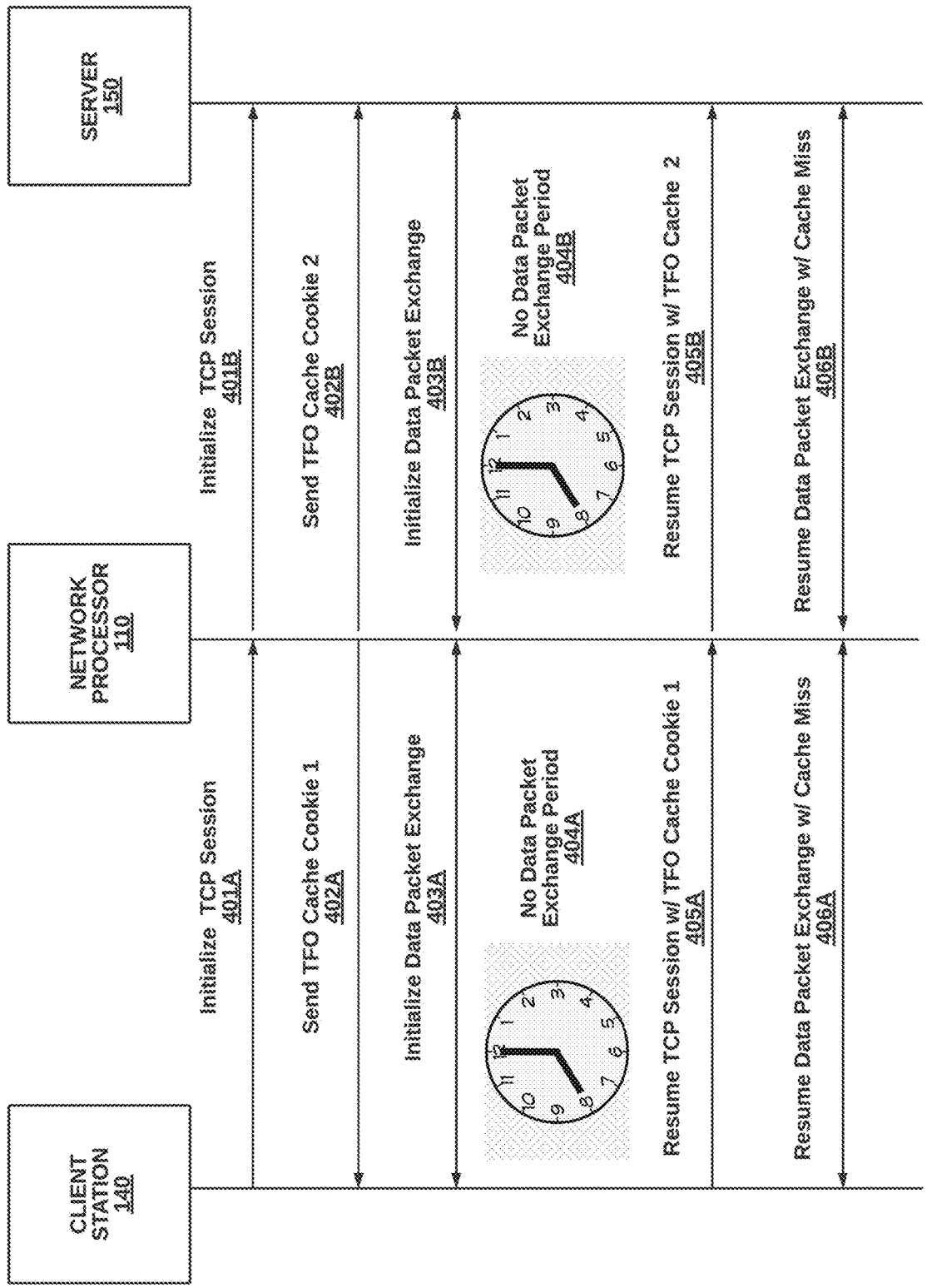
FIG. 4 is a high-level interaction diagram illustrating communications for 2-sided TFO cookie management as in a middleman configuration, according to one embodiment.

The network processor 120 modifies TFO cookies during an initial session in order to bypass classification in a subsequent session, after the session has been off long enough to cause a cache miss. Once the session has resumed streaming data packets, the network processor 120 exposes TFO cookies to identify previous classification of sessions, as shown in FIG. 3 in interactions 301 to 306 and detailed below. In other embodiments, as shown in FIG. 4 in interactions 401A,B to 406A,B and detailed below, the network processor 120 maintains TFO cookies on both sides of communication. More particularly, TFO cookie 1 142 is assigned on the enterprise side to the client station 140 and TFO cookie 2 152 is assigned on the WAN side to the server 150. This middleman configuration can be aided by translation in the network processor 120, swapping TFO cookie 1 142 for TFO cookie 2 152 within TFO metadata of a data packet as it is processed.

The TFO option uses a cookie to enable data exchange during 3WHS, which effectively reduces the data transfer delay in TCP on-off flows compared with the case without TFO. In order to activate TFO, both the server and the client are required to support it, otherwise the connection falls back to a traditional TCP. As described in RFC 7413, in a TCP header, similar to many other TCP options, TFO option has 3 fields, Kind, Length, and Cookie. The Kind field carries value 34 which is assigned to TFO by Internet Assigned Numbers Authority (IANA), and occupies 1 byte. The Length field also uses 1 byte, with a value ranging from 2 to 18. A length of 2 implies an empty cookie, which is combined with the SYN flag to act as a cookie request. A valid Cookie field can be either empty with length 0, or non-empty with a length from 4 to 16 bytes.

When TFO is enabled, at the first time of a TCP 3WHS, the client sends a TCP SYN message in a packet that includes TFO with an empty cookie. After the SYN arrives at the network processor 120, a cache miss is expected. A policy rule search is initiated to find a rule ID, based on which an action instruction is generated for the network policy engine 130. This action instruction is written to a newly created cache entry. Most importantly, the rule ID is used to generate a cookie (encrypted with some other parameters) which is put into the TFO Cookie field and sent back to the client in a SYN-ACK. The client station 140 keeps the cookie for future SYN messages.

The client station 140 may stop data transfer for a while when entering an off period, and continue with the same server later during the next on period, but the previous TCP connection has expired. In this case, the client sends a SYN with the cookie it received last time in the SYN-ACK from the NP. When the SYN arrives at the network processor 120, there are two possibilities: 1) the cache entry matching this packet is still valid, and the NP processes the packet based on the cached action instruction; or 2) the cache entry is expired, and the NP uses the TFO cookie to find the rule ID quickly. The expensive rule ID searching process is thus bypassed.

There are several reasons for using a rule ID in a TFO cookie. The rule ID is much shorter than the action instruction. If the total number of rules N is within 64 k, a field of 16 bits is sufficient for representing a rule ID. On the contrary, an IPv6 source NAT action instruction requires at least 144 bits (an IPv6 source address plus a source port). In an enterprise-grade NP, when sophisticated firewall and gateway functionalities are enabled, much larger action instructions (such as 512 bits or 1024 bits) are common. Therefore, an action instruction does not fit into a cookie, while a rule ID is a suitable candidate (including encryption overhead). Another reason of not using an action instruction directly is that once a cache entry is expired, certain resources used by that instruction may be recycled and re-assigned to new flows. A rule ID does not have these issues.

Tables 1 through 7 depict an example of pseudocode for implementing the functionality discussed herein. When packet p is received, the network processor 120 extracts certain fields of p according to the selected classification scheme, and combines them into a key (k). It also checks whether p contains a TCP SYN as well as a TFO option. If either one is missing, full_match is activated by the packet classifier to find the matched rule ID (rid).

If the TFO of p is enabled, the network processor 120 extracts the cookie (ci) from the TFO Cookie field. If ci is non-empty, i.e, the length of the Cookie field is non-zero, ci is decoded to get rid. Then, rid and k are sent to function is_rule_valid to validate rid. A validation method is to get the rule entry according to rid from a policy database, and check whether k satisfies the rule's condition.

If rid is invalid, handle_inv_rule can be called. This is the function of processing packets mapped to an invalid rule, which can be as simple as a packet drop, or other actions configured by administrators. If rid is valid but the cookie needs an update, encode_cookie is called to get a new ci.

If ci is empty, which indicates this SYN also serves as a cookie request, the network processor 120 calls cookie_gen.

In some embodiments, there are two functions working as a pair, encode_cookie and decode_cookie. The former converts rid to cookie ci, and the latter ci to rid. For security purposes, cookie encoding/decoding is an encryption/decryption process. A common practice is to use an encryption key to feed into a selected encryption program with the input data. The encryption key may expire and meanwhile be replaced by a new key.

TABLE 1

| Annotations for psuedocode |
|---|
| act: action instruction derived from key of incoming packet and rule ID |
| ce: cookie cache entry |
| ci: cookie carried by p |
| cid: cookie cache entry id (entry index) |
| co: cookie used to replace ci when forwarding p |
| fid: a random flow id generated with cookie ci |
| fid2: flow id that is stored in a cookie cache entry |
| k: key of incaming packet (combination of multiple fields) |
| p: incoming packet |
| rid: rule id which can be encode into or decoded from ci |
| rid2: rule id that is stored in a cookie cache entry |
| v: cookie validity (true/false) |
| INVALID_COOKIE: a predefined magic value to indicate a cookie is invalid |
| EMPTY_CCOKIE: TFO with length=2, i.e., a cookie with 0 bytes. SYN with empty cookie implies a cookie request |

TABLE 2

Incoming packet processing act: action instruction derived from key of incoming packet and rule ID
ce: cookie cache entry
ci: cookie carried by p
cid: cookie cache entry id (entry index)
co: cookie used to replace ci when forwarding p
fid: a random flow id generated with cookie ci
fid2: flow id that is stored in a cookie cache entry
k: key of incoming packet (combination of multiple fields)
p: incoming packet
rid: rule id which can be encode into or decoded from ci
rid2: rule id that is stored in a cookie cache entry
v: cookie validity (true/false)
INVALID_COOKIE: a predefined magic value to indicate a cookie is invalid
EMPTY_COOKIE: TFO with length=2, i.e., a cookie with 0 bytes. SYN with empty cookie implies a cookie request The network processor 120 places this returned cookie in its TFO of the SYN-ACK response and sends it back to the client station 140. When rid is valid and k is ready, the network processor 120 generates an action instruction act for the network policy engine 130 to handle the packet accordingly.

TABLE 3

Cookie generation

```
cookie_gen(k) /* returns (cookie, rule ID) */
{
    rid = full_match(k); /* expensive */
    ci = encode_cookie(rid);
    return (ci, rid);
}
```

TABLE 4

Condition check for cookie translation

```
need_translation(np, client, server)
{
    if (np == server)
        return false;
    if (!is_tfo_enabled(np))
        /* TFO between server and client is transparent to NP */
        return false;
    if (is_tfo_enabled(client) && is_tfo_enabled (server) )
        return true;
    return false;
}
```

For middleman situations, cookie translation may be necessary. If the network processor 120 is an integral part of the server, the cookie used by the client can simply be the same cookie valid for the server. However, when the network processor 120 sits in between the client and the server, a cookie translation mechanism is required to maintain TFO transparency for the client and the server. This involves a method that converts a cookie valid on one side of the network processor 120 to another cookie valid on the other side. Since the network processor 120 uses TFO Cookie to enable fast rule mapping from a TCP client, on the client side, this cookie is generated by the network processor 120. On the server side, the cookie is generated by the server 150. Therefore, when two different cookies co-exist on a TCP connection between the client station 140 and the server 150, a translation is necessary. A condition check can be performed to determine whether cookie translation is necessary. Here, is_tfo_enabled is a pseudo function to check TFO enabling status, which is configured on the network processor 120 if np is the argument. In addition, by observing the TCP connection establishment, the network processor 120 knows this status for the client station 140 and the server 150. If need_translation returns true, the network processor 120 conducts the initial translation.

A cookie cache can carry the translation mapping information from the cookie on the client side (ci) to the cookie on the server side (co). To find the correct cookie entry (ce) corresponding to ci, a cookie cache entry ID (cid) is used. Similar to rid vs a full-match rule or an action instruction, cid (e.g., 16 bits for 64 k cache entries) is much more space-saving than ci itself (up to 16 bytes). If we do not keep the full ci in ce, some cache tag is needed to help check whether cid points to the correct ce. To solve this, another variable called flow ID (fid) is presented, which is a random variable generated by the NP when it handles cookie generation and translation. Note that fid here is different from flow label coming with p (such as that in an IPv6 header). Thus, ce has a format of tuple (rid, fid, co).

The wider fid is, the less chance ce indexed by cid is recognized as a match entry incorrectly (false positive). For example, a 16-bit fid has a false positive rate of 1/64k, while a 20-bit fid reduces it to 1/1M. It is worth pointing out that even if false positive happens, the TFO protocol guarantees that the TCP connection falls back to non-TFO mode and the communication continues but with a higher latency.

To support cookie cache in Table 7, decode_cookie and encode_cookie are enhanced. By taking cid and fid into consideration, cookie encoding becomes ci=encode_cookie (cid, rid, fid) and cookie decoding becomes (cid, rid, fid)=decode_cookie(ci). Accordingly, cookie_gen is replaced by cookie_gen_w_ct, and recv by recv_w_ct. As the response to a TFO cookie request, in cookie_gen_w_ct, after rid is found, a random fid is generated, and a cookie cache entry is allocated, either on a free cache entry or potentially by a cache replacement scheme evicting another cookie cache entry. The cookie cache entry has index cid, which is combined with rid and fid together and encrypted as ci. The cookie cache is updated to hold (rid, fid, co), and tuple (ci, rid, fid) is returned to recv_w_ct. When (ci, rid, fid) is available, co is obtained by cookie translation (see FIG. 7), and fed into action_config along with k and rid, to set up the action instruction.

TABLE 5

Cookie generation with cookie translation

```
/* work with cookie translation */
cookie_gen_w_ct(k)
{
  rid = full_match(k); /* expensive */
  fid = random( );
  (cid, ce) = find_available_cookie_cache( );
    /* cache replacement scheme included */
  ci = encode_cookie(cid, rid, fid);
  ce = (rid, fid, co); /* install cache entry */
  return (ci, rid, fid);
}
```

TABLE 6

Cookie translation

```
cookie_translate(cid, rid, fid)
{
  (rid2, fid2, co) = get_cookie_cache(cid);
  if (rid != rid2 || fid != fid2)
    return INVALID_COOKIE;
  else
    return co;
}
```

TABLE 7

Incoming packet processing with cookie transaction

```
recv_w_ct(p)
{
  k = get_key(p);
  co = INVALID_COOKIE;
  if (!is_tcp_syn(p) || !has_tcp_tfo(p)) {
    rid = full_match(k); /* expensive */
  } else {
    ci = extract_cookie(p);
    if (ci != EMPTY_COOKIE) {
      (cid, rid, fid) = decode_cookie(ci);
      v = is_rule_valid(k, rid);
      if (v == false) { /* invalid rule */
        handle_inv_rule(p); /* action to handle invalid rule */
        return;
      }
      if (need_cookie_update) {
        ci = encode_cookie(cid, rid, fid);
      }
      co = cookie_translate(cid, rid, fid);
    } else { /* ci == EMPTY_COOKIE */
      (ci, rid, fid) = cookie_gen_w_ct(k);
      if (need_translation) {
        co = cookie_translate(cid, rid, fid);
      }
    }
    set_synack_tfo(ci);
  }
  act = action_config(k, rid, co);
  action_enque(act); /* to Action Engine */
}
```

More generally, the network processor 120 can be a standard CPU, an ASIC, programmable logic, or the like. Preferably, the network processor 120 is optimized specifically for processing data packets exchanged across the data communication system 101. Microcode, cache size and type, register sizes, and other aspects of the network processor 120 can be designed for packet processing. Details of the network processor 120 and operations therein are set forth more fully below with respect to FIG. 2.

The network policy module 130 is an action engine that applies policies against sessions responsive to classification of a particular session. In one case, the network policy module 130 receives a policy identifier over line 102. Policies can be automatically or manually stored and updated. In one embodiment, a policy includes a number of parameters, conditions, Boolean rules and artificial intelligence inputs. Policies can relate to quality of service, throughput limits or minimums, types of devices, particular users, type of traffic, and the like. For example, audio, video and voice can have different rules on an enterprise network, at different times and during varying network conditions.

The client station 140 enables TFO cookies to reinstate an on/off TCP connection. For example, a page of Google search results in a browser displayed on the client station 140 provides a list of result for a user. The user may click on a first result, and browse the web site for several minutes or longer before returning to the search results to click on a second or third result. In between clicks on the search results page, the network processor 120 may drop the session from cache to make room for more recent sessions. The client station 140 can be a smart phone, a laptop, a Chromebook, a tablet, an IoT (Internet of Things) device, a smart appliance, an alarm system, or any networked device exchanging data packets and/or control packets with the data communication network 199. One embodiment includes a daemon or other app capable of enabling TFO. The daemon can store TFO cookies from different sessions until stale. Another embodiment, stores TFO cookies for days, weeks or months. In other embodiments, a heartbeat is sent out periodically to maintain the connection.

FIG. 2 is a more detailed block diagram illustrating the network processor 120 of the system of FIG. 1, according to one embodiment. The network processor 120 includes a packet processor 210, a policy cache 220, and a packet classifier 230. The component functionalities can be implemented in hardware, microcode, high level software code, or a combination.

The packet parser 210, or metadata extractor, examines incoming packets for metadata that identifies a session that the packet belongs to. One implementation pulls predetermined information from certain metadata fields such as source IP address, source port, destination IP address, and destination port, to generate a key unique to a particular session. Furthermore, the packet parser 210 can use the TFO data format to find the TFO cookie for the session.

The policy cache 220 is a policy action cache that generates a key from the metadata to retrieve classification data about the session that the packet belongs to. If there is a cache hit for a session to which the packet belongs to, policy classification is available without the expense of classification. In other words, other packets from the same session had refreshed the session information in the cache which works best with high frequency sessions.

Upon a cache miss, however, the policy cache 220 does not have previous session data still saved. There can be various data storage policies for a network processor, such as last in first out, priority-based cache storage, least recently used (LRU) replacement, and the like, but cache for network processors are typically small and must constantly pare down dead data.

Rather than immediately sending the data packet to the packet classifier 230, the policy cache 220 relies upon TFO cookies to store classification information in an attempt to bypass the expense of classification. In one embodiment, the packet classifier 230 can be reduced in size due to this efficiency utilizing TFO. The packet parser 210 or the policy cache 220 can retrieve a TFO cookie from the data packet.

The packet classifier 230 searches for rules associated with a session by classifying data packets. Once retrieved, the rule ID is placed on line 103 along with cache hits for action by the network policy engine 130.

Figure 5:
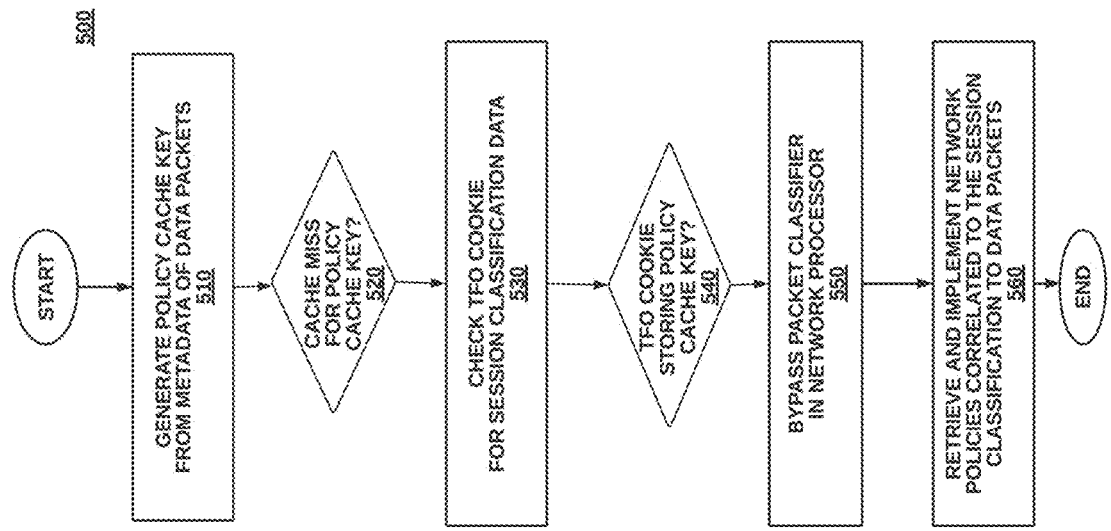
FIG. 5 is a high-level flow chart illustrating a method for accelerating TCP classification of sessions for cache misses in a network processor, according to one embodiment.

Methods for Accelerating TCP Classification (FIG. 5)

FIG. 5 is a high-level flow diagram illustrating a method 500 for accelerating TCP classification, according to one embodiment. The method 500 can be implemented by, for example, the network processor 120 of FIG. 1. The steps of the method can be performed as shown or in different orders, with additional steps included, over various embodiments.

At step 510, a policy cache key is generated from metadata of data packets. For example, different combinations of source IP address, source port, destination IP address, and destination port form a key for looking up session cache entries. If there is a cache miss for the cache policy, at step 520, a TFO Cookie is checked at step 530.

If the TFO Cookie is identified with a rule ID, at step 540, the packet classifier of the network processor is bypassed at step 550. The latency saved in this bypass improves performance of the network processor.

Figure 6:
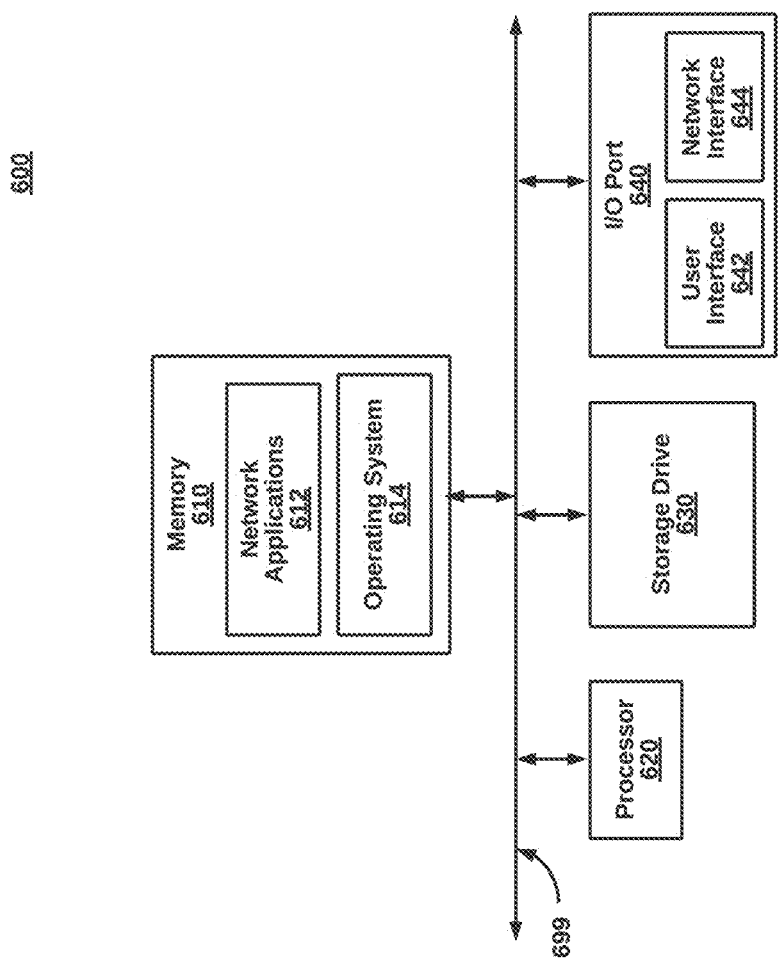
FIG. 6 is a block diagram illustrating an example computing device, according to one embodiment.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, such as the cloud-based SD-WAN controller 110, the network device 110, the client station 140, and the server 150. Additionally, the computing device 600 is merely an example implementation itself, since the system 100 can also be fully or partially implemented with laptop computers, tablet computers, smart phones, Internet appliances, and the like.

The computing device 600, of the present embodiment, includes a memory 610, a processor 620, a hard drive 630, and an I/O port 640. Each of the components is coupled for electronic communication via a bus 699. Communication can be digital and/or analog, and use any suitable protocol.

The memory 610 further comprises network applications 612 and an operating system 614. The network applications 620 can include the modules of network applications. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A network processor, coupled in communication with a data communication network, for accelerating TCP classification sessions for cache misses in a network processor, the network processor comprising:
    a packet parser to generate a key from TCP metadata of a data packet for a specific session;
    a packet cache to store recent network policy identifiers associated with a plurality of network sessions, wherein the key is used as an index to search the packet cache,
    wherein responsive to a cache hit, the classification pipeline is bypassed for the data packets of the specific sessions;
    wherein responsive to a cache miss, prior to sending to the classification pipeline, checking a cookie field for a rule ID corresponding to an action instruction and stored by the client during a previous session as generated by the network processor, and responsive to no rule ID, the classification pipeline is activated, and
    wherein responsive to identifying a rule ID for the session, the classification pipeline is bypassed for the data packets of the specific sessions.

2. The network processor of claim 1, wherein the packet cache assigns a rule ID to the specific session during set up, and the packet cache transmits the rule ID to the client via a TFO Cookie.

3. The network processor of claim 1, wherein the client stores the rule ID.

4. The network processor of claim 1, wherein the packet cache deletes the rule ID for the specific session, for new data storage, due to a period of time during which the specific session is dormant.

5. The network processor of claim 1, wherein the packet cache transmits a second TFO Cookie to a server in communication with the client responsive to the network processor being located in between the client and the server, and the cookie cache translates between the first TFO Cookie and the second TFO Cookie.

6. The network processor of claim 1, further comprising wherein the packet cache transmits second rule ID to a server in communication with the client.

7. The network processor of claim 1, further comprising:
    a network policy module, coupled in communication with the network processor, retrieve a network policy based on the rule ID.

8. The network processor claim 7, wherein the network policy module applies the network policy to data packets of the particular session.

9. A method in a network processor, coupled in communication with a data communication network, for accelerating TCP classification sessions for cache misses in a network processor, the method comprising:
    generating a key from TCP metadata of a data packet for a specific session;
    storing in a packet cache recent network policy identifiers associated with a plurality of network sessions, wherein the key is used as an index to search the packet cache,
    wherein responsive to a cache hit, the classification pipeline is bypassed for the data packets of the specific sessions;
    wherein responsive to a cache miss, prior to sending to the classification pipeline, checking a cookie field for a rule ID corresponding to an action instruction and stored by the client during a previous session as generated by the network processor, and responsive to no rule ID, the classification pipeline is activated, and
    wherein responsive to identifying a rule ID for the session, the classification pipeline is bypassed for the data packets of the specific sessions.

10. The method of claim 9, wherein the packet cache assigns a rule ID to the specific session during set up, and the packet cache transmits the rule ID to the client via a TFO Cookie.

11. The method of claim 9, wherein the client stores the rule ID.

12. The method of claim 9, wherein the packet cache deletes the rule ID for the specific session, for new data storage, due to a period of time during which the specific session is dormant.

13. The method of claim 9, wherein the packet cache transmits a second TFO Cookie to a server in communication with the client responsive to the network processor being located in between the client and the server, and the cookie cache translates between the first TFO Cookie and the second TFO Cookie.

14. The method of claim 9, further comprising wherein the packet cache transmits second rule ID to a server in communication with the client.

15. The method of claim 9, further comprising:
    a network policy module, coupled in communication with the network processor, retrieve a network policy based on the rule ID.

16. The method of claim 15, wherein the network policy module applies the network policy to data packets of the particular session.

17. A non-transitory computer-readable media, storing computer source code that, when executed by a network processor, coupled in communication with a data communication network, performing a method for accelerating TCP classification sessions for cache misses in a network processor, the method comprising:
    generating a key from TCP metadata of a data packet for a specific session;
    storing in a packet cache recent network policy identifiers associated with a plurality of network sessions, wherein the key is used as an index to search the packet cache,
    wherein responsive to a cache hit, the classification pipeline is bypassed for the data packets of the specific sessions;
    wherein responsive to a cache miss, prior to sending to the classification pipeline, checking a cookie field for a rule ID corresponding to an action instruction and stored by the client during a previous session as generated by the network processor, and responsive to no rule ID, the classification pipeline is activated, and
    wherein responsive to identifying a rule ID for the session, the classification pipeline is bypassed for the data packets of the specific sessions.

18. The method of claim 17, wherein the client stores the rule ID.

19. The method of claim 17, wherein the packet cache deletes the rule ID for the specific session, for new data storage, due to a period of time during which the specific session is dormant.

20. The method of claim 17, wherein the packet cache transmits a second TFO Cookie to a server in communication with the client responsive to the network processor being located in between the client and the server, and the cookie cache translates between the first TFO Cookie and the second TFO Cookie.

* * * * *